United States Patent
Nee et al.

(10) Patent No.: US 11,706,047 B2
(45) Date of Patent: *Jul. 18, 2023

(54) PROGRESSIVE MODULATION FOR DOWNSTREAM ACCESS

(71) Applicant: Entropic Communications, LLC, Carlsbad, CA (US)

(72) Inventors: Chi-ping Nee, Santee, CA (US); Michail Tsatsanis, Huntington Beach, CA (US); David Barr, San Jose, CA (US)

(73) Assignee: Entropic Communications, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/532,726

(22) Filed: Nov. 22, 2021

(65) Prior Publication Data

US 2022/0158864 A1   May 19, 2022

Related U.S. Application Data

(63) Continuation of application No. 17/230,677, filed on Apr. 14, 2021, now abandoned, which is a
(Continued)

(51) Int. Cl.
*H04L 12/28* (2006.01)
*H04L 5/16* (2006.01)
*H04B 7/155* (2006.01)

(52) U.S. Cl.
CPC ..... *H04L 12/2861* (2013.01); *H04B 7/15557* (2013.01); *H04L 5/16* (2013.01); *H04L 12/2801* (2013.01)

(58) Field of Classification Search
CPC ... H04L 12/2861; H04L 5/16; H04L 12/2801; H04B 7/15557
See application file for complete search history.

(56) References Cited

U.S. PATENT DOCUMENTS 6,961,314 B1   11/2005   Quigley
9,780,962 B2   10/2017   Nee et al.
(Continued)

FOREIGN PATENT DOCUMENTS

EP    1608100 A1    12/2005
EP    2200304 A2    6/2010

OTHER PUBLICATIONS

International Search Report and Written Opinion dated Jun. 28, 2013 corresponding to International Application No. PCT/US2013/036724.
(Continued)

*Primary Examiner* — Ajay Cattungal
(74) *Attorney, Agent, or Firm* — McAndrews, Held & Malloy, Ltd.

(57) ABSTRACT

A method, system and computer program for transmitting at least two payloads in a downstream traffic phase of a time-division duplex (TDD) cycle with a single preamble from a headend followed by concatenated payloads without intervening preambles, whereby the payloads are ranked by increasing modulation profiles. The preamble, and concatenated and ordered set of payloads are then transmitted to two or more predetermined customer premise equipments (CPEs).

20 Claims, 3 Drawing Sheets

Related U.S. Application Data continuation of application No. 17/011,130, filed on Sep. 3, 2020, now abandoned, which is a continuation of application No. 16/188,962, filed on Nov. 13, 2018, now Pat. No. 10,771,278, which is a continuation of application No. 15/717,550, filed on Sep. 27, 2017, now Pat. No. 10,129,048, which is a continuation of application No. 14/394,800, filed as application No. PCT/US2013/036724 on Apr. 16, 2013, now Pat. No. 9,780,962.

(60) Provisional application No. 61/624,546, filed on Apr. 16, 2012.

(56) References Cited

U.S. PATENT DOCUMENTS

| | | | |
|---|---|---|---|
| 10,771,278 B2 * | 9/2020 | Nee | H04L 5/16 |
| 2005/0068900 A1 | 3/2005 | Stephens et al. | |
| 2005/0281217 A1 | 12/2005 | Mottier | |
| 2006/0221807 A1 * | 10/2006 | Fukuoka | H04L 1/0071 370/203 |
| 2008/0151790 A1 * | 6/2008 | Lee | H04L 12/2892 370/282 |
| 2010/0020776 A1 * | 1/2010 | Youssef | H04W 64/00 455/456.3 |
| 2010/0158021 A1 * | 6/2010 | Kliger | H04L 12/2801 370/400 |
| 2010/0180171 A1 * | 7/2010 | Liu | H04L 69/324 714/748 |
| 2011/0007759 A1 | 1/2011 | Dawson et al. | |
| 2013/0121084 A1 * | 5/2013 | Jeon | G11C 11/5642 365/185.24 |
| 2013/0268723 A1 * | 10/2013 | Jiang | G11C 11/5628 365/185.03 |
| 2015/0304125 A1 | 10/2015 | Nee et al. | |

OTHER PUBLICATIONS

Communication with Extended European search report dated Oct. 21, 2015 corresponding to European Application No. 13778670.3.

* cited by examiner

PROGRESSIVE MODULATION FOR DOWNSTREAM ACCESS

CROSS-REFERENCE TO RELATED APPLICATIONS

This application is a continuation of U.S. patent application Ser. No. 17/230,677, filed Apr. 14, 2021, and titled "Progressive Modulation for Downstream Access"; which is a continuation of U.S. patent application Ser. No. 17/011,130, filed Sep. 3, 2020, and titled "Progressive Modulation for Downstream Access"; which is a continuation of U.S. patent application Ser. No. 16/188,962, filed Nov. 13, 2018, and titled "Progressive Modulation for Downstream Access," now U.S. Pat. No. 10,771,278; which is a continuation of U.S. patent application Ser. No. 15/717,550, filed Sep. 27, 2017, and titled "Progressive Modulation for Downstream Access," now U.S. Pat. No. 10,129,048; which is a continuation of U.S. patent application Ser. No. 14/394,800, filed Oct. 16, 2014, and titled "Progressive Modulation for Downstream Access," now U.S. Pat. No. 9,780,962; which is a 371 of International Patent Application No. PCT/US2013/036724, filed Apr. 16, 2013, and titled "Progressive Modulation for Downstream Access;" which claims the priority benefit of U.S. Provisional Patent Application Ser. No. 61/624,546, filed Apr. 16, 2012. Each of the applications identified above is hereby incorporated herein by reference in its entirety.

FIELD

This disclosure is related to a communication network and more particularly to progressive modulation of downstream traffic transmissions in Access Networks that use time-division duplexing (TDD).

BACKGROUND INFORMATION

Multimedia over coax alliance (MoCA) technology for home networks is well-known and well-understood by someone skilled in the art, as shown and described in www.MoCAlliance.org. MoCA is commonly used to form a home network, which conveys Ethernet frames among different rooms in the home over existing coaxial cabling. MoCA's traffic model is known as multipoint-to-multipoint, because generally every MoCA device in the home can communicate directly with any other MoCA device in the home. One of the MoCA devices in the home is designated the Network Coordinator and becomes responsible for coordinating and scheduling all traffic on the MoCA home network. MoCA devices form burst transmissions that are launched on the coax cables as radio-frequency (RF) signal transmissions. These transmissions propagate over the coax medium to reach one or more or all of the other MoCA devices in the home network. The Network Coordinator schedules the time and spacing of individual burst transmissions so they do not destructively collide (e.g., overlap in time) at the intended receiver(s). This scheduled arrangement for sharing a communication channel on the coax medium for traffic from and to various endpoints is commonly known as time-division multiple access (TDMA).

Entropic's c.LINK® technology is a coax access system that has some elements similar to MoCA technology for Access Networks. The c.LINK access networks have been deployed in China to service multiple-dwelling units (MDU) (e.g., apartment buildings) over coax cable plants. These adaptations include:

a) locating the Network Coordinator at a headend site;
b) locating individual c.LINK devices as customer premise equipment (CPE);
c) scheduling traffic as time-division duplex (TDD);
d) scheduling downstream traffic from the headend-to-CPEs, aka point-to-multipoint;
e) scheduling upstream traffic from CPEs-to-headend, aka multipoint-to-point.

Access Networks are typically deployed by operator/service providers (OSPs) to provide paid high-speed access to the internet and other OSP-provided services. This includes residential services (such as pay TV, telephony, and internet data), as well as business services for businesses seeking strict quality of service (QoS) service level agreement (SLA) contracts including low-latency, low-jitter, and guaranteed throughput. The OSP typically deploys equipment at some headend (e.g., located in an OSP's central office site, or near some residential neighborhood, or in the basement of an MDU), which communicates with each of one or more (typically a plurality of) customer premise equipments (CPEs) deployed at endpoint sites such as individual residences or businesses. The headend can transmit messages downstream (DS) over the access network to CPEs (aka point-to-multipoint), and the CPE endpoints can transmit messages upstream (US) to the headend in the opposite direction over the access network (aka multipoint-to-point). Access networks can be based on various media types, such as:

a) Fiber optic cabling;
b) Coaxial metallic cabling;
c) HFC hybrid fiber and coax cabling (e.g., as identified in http://www.ieee802.org/3/epoc/public/mar12/schmitt_01_0312.pdf);
d) Other metallic cabling (e.g., twisted-pair copper subscriber loops);
e) Other hybrids, such as fiber and twisted-pair; and,
f) Wireless media, such over the air transmissions.

The access network medium may contain a cascade of various active components (such as signal amplifiers), as well as lossy passive components (such as splitters or taps), deployed at various fixed locations in the network. Also, the distances, or medium pathlength, from the headend will generally vary for each CPE. These differences generally result in differing propagation times among the various branches in the network, as well as differing arrival amplitudes of transmitted signals. Consequently, the path between the headend and each CPE will vary, and the associated signal attenuation, or pathloss, will vary correspondingly. If the pathloss is relatively low, the CPE may be characterized as nearby the headend. If the pathloss is relatively high, the CPE may be characterized as distant from the headend.

Upstream (US) transmissions are formed and launched by CPEs, but are generally not continuous, so upstream traffic from a plurality of CPEs is typically coordinated by the headend in order to ensure that those non-continuous or burst transmissions from various CPEs do not collide (overlap in time) and that the headend receiver will observe an orderly sequential arrival of burst transmissions from different CPEs in a predictable order and at predictable times (within some tolerance of time-jitter). This approach is often called time-division multiple access (TDMA).

Some OSPs operate their access network such that upstream traffic and downstream traffic use different frequencies or wavelengths, enabling transmissions in both directions, simultaneously and independently (i.e., full duplex). This particular duplexing strategy is called frequency division duplex (FDD). The headend has exclusive use and access to the downstream frequencies, and the headend can coordinate/schedule use of the upstream frequencies independently from the downstream. FDD is relatively common on access networks today, even though FDD operation does incur overheads that reduce spectral efficiency, such as the spectral guard band imposed by inflexible diplex filters distributed throughout the access network cascade (e.g., to isolate the US and DS traffic from each other).

However, many OSPs desire a different mode of operation: time-division duplex (TDD), where a single RF spectral channel-width (or single optical wavelength) is being used, and alternating-in-time between upstream and downstream (half duplex). TDD's single half-duplex channel alternates between upstream (US) and downstream (DS) traffic, which implies the DS link would be unavailable during US traffic, and vice versa. OSPs wish to consider such a mode due to TDD's increased flexibility (compared to FDD) for adapting to the evolution of future US and DS traffic patterns. One benefit of TDD is that the symmetry or asymmetry of the US and DS capacities is a relatively simple (and realtime) adjustment of the duty-cycle phasing of the TDD Cycle. Use of TDD in the Access Network enables a more flexible way for OSPs to easily, quickly and inexpensively adjust the relative throughput capacity of the upstream and downstream directions within a single spectral allocation. Whereas, FDD requires paired spectral allocations typically established by inflexible diplex filters distributed throughout the access network cascade. For a given total aggregate spectral allocation, TDD's single spectral allocation can be made as wide as the sum of FDD's paired allocations, enabling TDD's burst datarate capability in either direction being approximately double that of FDD in either direction (for symmetric US and DS FDD allocations). A more extensive discussion of TDD is available at the website located at http://www.ieee802.org/3/epoc/public/may12/barr_01_0512.pdf.

Some access networks currently deploy TDD technology, such as c.LINK Access, which is typically used to service MDUs in China. In addition, there are new access network technologies currently under development (e.g., in the IEEE 802.3bn EPoC Task Force, and in ITU-T G.fast) which are being designed to leverage the inherent flexibility of TDD.

TDD operation has certain overheads that reduce temporal efficiency. For example, it is necessary for the headend scheduler to avoid collisions in the TDD mode of operation by segregating the upstream traffic from downstream traffic with a time gap, such as an inter-phase gap (IPG) between TDD phases. An IPG may include time intervals for transmissions to complete their propagation from transmitter(s) to intended receiver(s), time for the medium to sufficiently quiesce (if necessary) after reception(s), and time for destination transceiver(s) to switch (if necessary) from receive to transmit mode. As shown in FIG. 1, the sequential combination of any two adjacent TDD phases (i.e., a single downstream phase 12 plus a single upstream phase 16) is called a TDD Cycle 10. There are IPGs 14 between phases. TDD Cycles 10 with duration on the order of 1 millisecond are commonly deployed in access networks employing TDD (although longer or shorter durations can be used). In the TDD mode of operation, it is common for each transmitter to prepend a preamble signal at the beginning of each of its transmissions. These preambles include reference signals which can be useful to facilitate receivers in detecting and acquiring the physical layer (PHY) parameters required to properly decode the transmission, such as gain, frequency-offset and timing information. The time intervals that preambles consume on the medium, are generally accounted as overhead for TDD. In the upstream, the PHY of each CPE typically starts its burst transmission with a preamble as shown in FIG. 2, where preamble 18 is transmitted first, followed by payload 20 (message-information or user-data carrying portion) of the transmission.

These upstream preambles facilitate the headend receiver to detect and acquire the PHY layer parameters which in general are unique to each individual CPE device. For example, the differing pathloss from each CPE to the headend generally results in differences in arrival amplitude at the headend from each CPE's upstream transmissions. These differences in arrival amplitude correspond in general to different SNRs as received at the headend. Anyone skilled in the art knows that the capacity for a channel to carry information is closely related to this received SNR and is discussed in the website located at http://en.wikipedia.org/wiki/Channel_capacity.

When a CPE is nearby the headend, the pathloss may be low, the arrival amplitude may be high, and the SNR may be high, yielding a higher channel capacity to or from that particular CPE. Conversely, when a CPE is distant from the headend, the pathloss may be high, the arrival amplitude may be low, and the SNR may be low, yielding a lower channel capacity to or from that particular CPE. The headend, being aware of these differences in reception, generally schedules each CPE to transmit its payload information using a modulation profile that corresponds to the particular SNR that can be received from that particular CPE. For example, the headend might schedule a higher modulation profile for nearby CPEs, and a lower modulation profile for distant CPEs.

Modulation Profile (MP) generally refers to various combinations of modulation density with forward error correction, or MCS modulation and coding scheme, as discussed in the website located at http://en.wikipedia.org/wiki/Modulation_and_coding_scheme. Different Modulation Profiles are generally chosen to adapt communication signal transmissions to the particular conditions experienced on the communications channel. A high modulation profile generally corresponds to a relatively high-density modulation (e.g., 1024-QAM, being higher than 256-QAM), and/or a relatively high coding rate for forward error correction. A lower modulation profile corresponds to a relatively low-density modulation (e.g., 256-QAM, being lower than 1024-QAM), and/or a relatively lower coding rate for forward error correction. A high modulation profile carries more information bits per second (or per symbol) than a lower modulation profile. However, high modulation profiles are more difficult to receive and decode (i.e., low receptivity), requiring better channel conditions (e.g., higher SNR) than would otherwise be required with a lower modulation profile that is easier to receive and decode (i.e., having higher receptivity).

Summarizing, for distant CPEs whose channel conditions are insufficient, the headend must resort to transmitting lower modulation profiles and suffer the lower bits-per-second information rate. It would be better for the OSP if the headend could transmit high modulation profiles whenever possible, enabling nearby CPEs whose channel conditions are sufficiently good to realize the higher bits-per-second information rate. However, preambles represent the overhead associated with the headend changing modulation profiles, and these overheads work against the benefits that otherwise could be realized by using different modulation profiles.

SUMMARY

The presently claimed Progressive Modulation invention improves the efficiency of downstream traffic transmissions in Access Networks that use TDD time-division duplexing. By concatenating payloads in rank order of progressively increasing modulation profile, the headend no longer needs to transmit intervening preambles before each new modulation profile.

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

BRIEF DESCRIPTION OF THE DRAWINGS

The disclosed method and apparatus, in accordance with one or more various embodiments, is described with reference to the following figures. The drawings are provided for purposes of illustration only, and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

State of the art for downstream TDD transmission is quite similar to that described for upstream: The headend transmits a preamble to facilitate the CPE receiver, followed by a payload whose modulation profile is chosen to adapt to the particular channel conditions for the particular intended CPE receiver. In the downstream case, the direction of the traffic is reversed, and the channel properties may in general be different from the upstream case, such as the pathloss (which may be characterized as distance), SNR, channel capacity, and receptivity, and these properties may vary per CPE. A preamble is broadly defined as to other well know methods having substantially the same purpose, such as: Header, PHY Header, Start Marker, PHY Start marker, Pilot Tones, Pilot Carriers or the like. Also, the preamble may carry some information about how the subsequent payload is to be decoded (e.g., some indication of the modulation profile). When the headend needs to send a different payload to a different CPE, it transmits another preamble first, followed by the payload adapted to the channel conditions for that particular CPE. The second preamble is needed to facilitate the second CPE receiver, because, although the second receiver would be able to detect and acquire the PHY layer parameters from the first preamble, the second CPE receiver is in general unable to receive and decode the first payload because it uses some other modulation profile, so the second receiver loses track of the headend's transmission. Thus, the second preamble is needed for the second CPE receiver to re-detect and re-acquire the signal from the headend before the second payload arrives.

Figure 1:
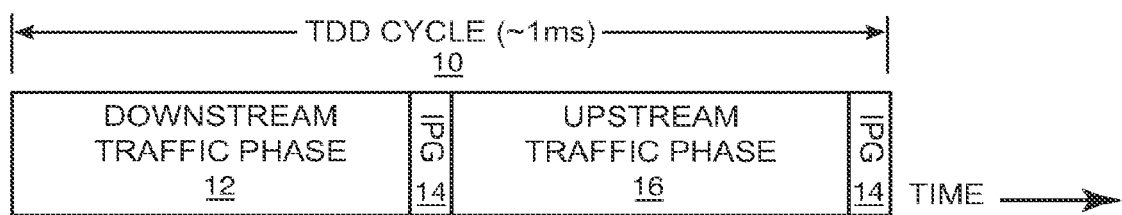
FIG. 1 is a depiction of a typical TDD cycle.
Figure 2:
FIG. 2 shows a typical PHY preamble and PHY payload.
Figure 3:
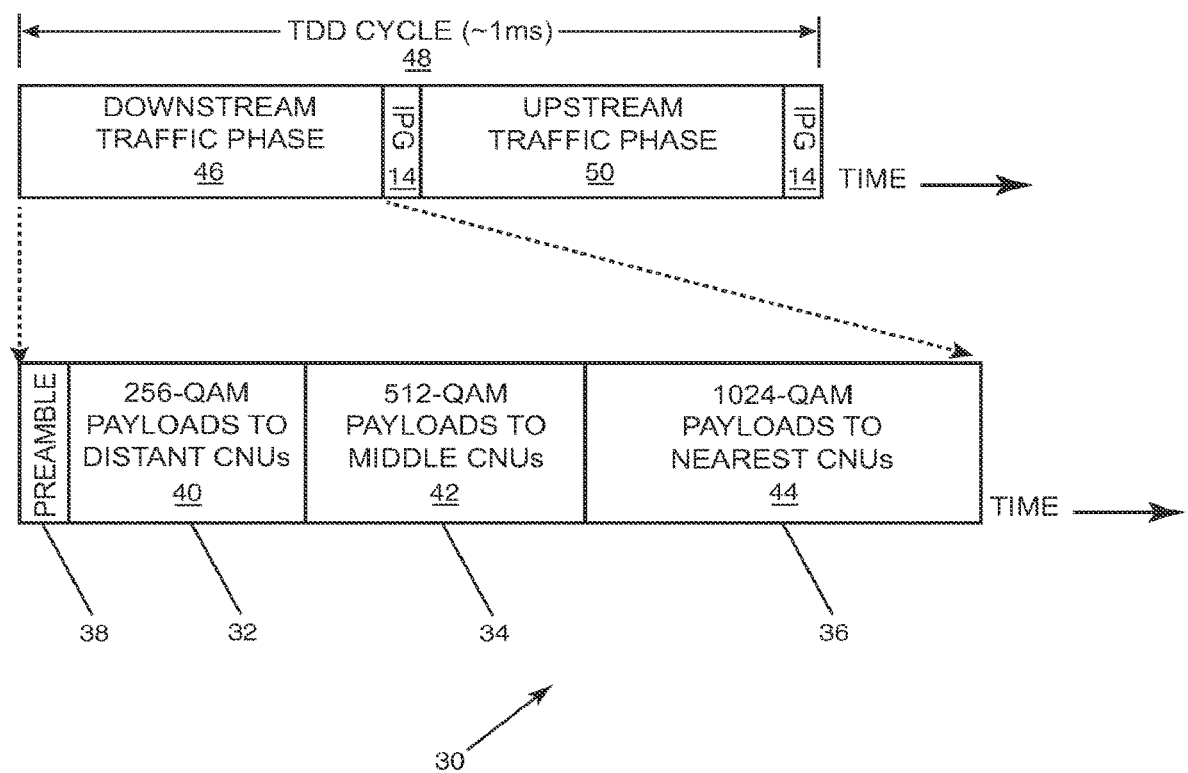
FIG. 3 shows the preferred embodiment of the claimed invention.

As shown in FIG. 3, the presently claimed invention teaches headend 30 to concatenate two or more of the downstream payloads, where each may have different modulation profiles, without requiring intervening preambles to be transmitted. Headend 30 transmits a single preamble 38 at the start of downstream phase 46, followed by the concatenated payloads 32, 34, 36. Although this disclosure in the examples described, only three payloads are described, this disclosure is intended to include any number of payloads. If two such payloads are concatenated by headend 30, then the presently claimed invention eliminates the need for the headend to transmit a second intervening preamble between them. If three such payloads are concatenated by the headend, then the presently claimed invention eliminates the need for the headend to transmit a second and third intervening preamble. A similar result is obtained for 4 or more such payloads that are concatenated by the headend. Headend 30 may concatenate in this fashion for as long as it has downstream data available for transmission to CPEs, or until reaching the end of downstream phase 46 of the current TDD Cycle 48. The headend would restart the process for each downstream phase of subsequent TDD Cycles.

An example of the claimed invention advances the state of the art because the amount of overhead consumed by downstream preambles is reduced, thereby making more channel-time available per downstream phase 46 for headend 30 to schedule information-carrying payloads. Furthermore, the overhead associated with employing a high order modulation profile for nearby CPEs is reduced, enabling the headend to more readily achieve the higher information-rates for those CPEs. This reduction in preamble overhead can be quite significant if many preambles are eliminated, such as the case when the headend is actively servicing a large number of CPEs and/or when there are many relatively short payloads to be transmitted downstream that are latency-sensitive. Making the downstream transmissions more efficient, the claimed invention enables the headend to sustain a higher downstream throughput capacity. Alternatively, the headend can schedule less time for downstream phases 46, thereby allowing for a greater volume of upstream traffic in upstream phases 50 to be transmitted, or allowing for shortened TDD Cycles 48 to reduce latency.

An example of the claimed invention, as shown in FIG. 3, teaches headend 30 to concatenate payloads in rank order of progressively increasing modulation profile. That is, a first payload 32 of a concatenated set of payloads has the lowest modulation profile of the set, and a last payload 36 of a concatenated set has the highest modulation profile in the set, and payloads in the middle 34 of a concatenated set have intermediate modulation profiles. As a very simplistic example, the payloads intended for the most distant CPEs 40 are transmitted by headend 30 shortly after preamble 38, followed by payloads intended for mid-range CPEs 42, then finally ending with payloads intended for the most nearby CPEs 44. This rank ordering by Progressive Modulation Profile is important, since it enables all of the intended CPEs to not only detect and acquire the PHY layer parameters from single leading preamble 38, but also to keep track of the headend's transmissions up to and including the particular payloads intended for those CPEs. Each CPE is typically informed by headend 30 beforehand which payloads within downstream phase 46 are intended for it (e.g., Headend 30 can inform this via a scheduling message(s) sent to CPEs beforehand, such as a well-known media access plan (MAP) message).

For example, consider the headend's downstream transmission from the perspective of the most distant CPE 40: Most distant CPE 40 receives single leading preamble 38, from which it detects and acquires the PHY layer parameters required to properly decode the subsequent payload, such as gain, frequency-offset and timing information. Very first payload 32 arriving after single leading preamble 38 is the payload with the lowest modulation profile (e.g., intended for the most distant CPE 40, for example 256-QAM). Consequently, this most distant CPE 40 is able to accurately track the headend's transmission for the duration of first payload 32, and accurately receive and decode the payload information bits intended for this most distant CPE 40. Next to arrive at most distant CPE 40 is second payload 34 in the concatenated set of payloads. Second payload 34 might possibly have the same modulation profile as first payload 32, but in general would have a higher modulation profile than first payload 32 (e.g., being intended for the next most distant CPE 42 to receive downstream traffic in the concatenated set, for example 512-QAM). This rank order by Progressive Modulation Profile is imposed by headend 30 according to the claimed invention. Second payload 34, having higher modulation profile, is more difficult for the most distant CPE 40 to track and decode accurately, and, in general, may not be accurately decoded. However, most distant CPE 40 has already received and decoded first payload 32 to which it was intended, and there is no longer any need for most distant CPE 40 to track or decode any more payloads in downstream phase 46 of current TDD Cycle 48.

Now consider the same example, but from the perspective of most nearby CPE 44: Most nearby CPE 44 receives single leading preamble 38, from which it detects and acquires the PHY layer parameters required to properly decode subsequent payloads, such as gain, frequency-offset and timing information. First payload 32 arriving after single leading preamble 38 is the payload with the lowest modulation profile (e.g., intended for most distant CPE 40). Consequently, most nearby CPE 44 is easily able to accurately track the headend's transmission for the duration of first payload 32. Next to arrive at most nearby CPE 44 is second payload 34 in the concatenated set of payloads. Second payload 34 might possibly have the same modulation profile as first payload 32, but in general would have a higher modulation profile than the first payload. Nevertheless, most nearby CPE 44 is able to continue accurately tracking the headend's transmission for the duration of second payload 34. Similarly, most nearby CPE 44 is able to continue accurately tracking all the subsequent payloads in downstream phase 46, even as their modulation profiles increase progressively. Finally, last payload 36 in the concatenated set, having the highest modulation profile of all (e.g., 1024-QAM), arrives at most nearby CPE 44. Last payload 36 is specifically intended for most nearby CPE 44, so it can be accurately tracked and decoded.

While various embodiments of the disclosed method and apparatus have been described above, it should be understood that they have been presented by way of example only, and should not limit the claimed invention. Likewise, the various diagrams may depict an example architectural or other configuration for the disclosed method and apparatus. This is done to aid in understanding the features and functionality that can be included in the disclosed method and apparatus. The claimed invention is not restricted to the illustrated example architectures or configurations, rather the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described. Thus, the breadth and scope of the claimed invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method comprising:
receiving a preamble of a message, wherein:
the message comprises a plurality of payloads following the preamble,
the plurality of payloads are arranged in an order of increasing modulation profile, and
there is no intervening preamble between adjacent payloads of the plurality of payloads;
identifying a payload of the plurality of payloads;
determining, according to the preamble, how to properly receive the identified payload; and
receiving the identified payload.

2. The method of claim 1, wherein:
the method is performed by a node in a network, and
the node receives the preamble and the payload from a coordinator of the network.

3. The method of claim 1, wherein:
the method is performed by a network node, and
the network node receives the preamble and the payload from a head end node.

4. The method of claim 1, wherein:
the preamble comprises physical (PHY) layer parameters for the plurality of payloads.

5. The method of claim 1, wherein:
there is no intervening information between adjacent ones of the plurality of payloads.

6. The method of claim 1, wherein:
the method is performed by a node,
the node is a closest node to a transmitter of the message, and
the identified payload is a last payload of the plurality of payloads.

7. The method of claim 1, wherein:
the plurality of payloads are arranged in an order of increasing degrees of Quadrature Amplitude Modulation (QAM).

8. A method, comprising:
receiving a first message identifying a payload of a plurality of payloads;
receiving a second message comprising:
a preamble, and
a plurality of payloads following the preamble, wherein the plurality of payloads comprise the identified payload and are arranged in an order of increasing modulation profile;
determining, based at least in part on the preamble, how to properly decode the identified payload; and
decoding the identified payload.

9. The method of claim 8, wherein:
the method is performed by a node in a network, and
the node receives the preamble and the payload from a coordinator of the network.

10. The method of claim 8, wherein:
the method is performed by a network node, and
the network node receives the preamble and the payload from a head end node.

11. The method of claim 8, wherein:
the preamble comprises physical (PHY) layer parameters for the plurality of payloads.

12. The method of claim 8, wherein:
there is no intervening information between adjacent ones of the plurality of payloads.

13. The method of claim 8, wherein:
the method is performed by a node,
the node is a closest node to a transmitter of the message, and
the identified payload is a last payload of the plurality of payloads.

14. The method of claim 8, wherein: the plurality of payloads are arranged in an order of increasing degrees of Quadrature Amplitude Modulation (QAM).

15. A method, comprising:
receiving a message from a transmitting node, the message comprising:
a preamble, and
a plurality of payloads following the preamble, wherein the plurality of payloads are arranged in an order based on distance from the transmitting node and there is no intervening preamble between adjacent ones of the plurality of payloads;
identifying a payload of the plurality of payloads;
determining, based at least in part on the preamble, how to properly receive the identified payload; and
receiving the identified payload.

16. The method of claim 15, wherein the plurality of payloads are arranged in an order of decreasing distance from a transmitting node.

17. The method of claim 15, wherein:
the method is performed by a node in a network, and
the node receives the preamble and the payload from a coordinator of the network.

18. The method of claim 15, wherein:
there is no intervening preamble between adjacent ones of the plurality of payloads.

19. The method of claim 15, wherein:
the preamble comprises physical (PHY) layer parameters for the plurality of payloads.

20. The method of claim 15, wherein:
there is no intervening information between adjacent ones of the plurality of payloads.

* * * * *